(12) United States Patent
He

(10) Patent No.: US 10,764,978 B2
(45) Date of Patent: Sep. 1, 2020

(54) CONTROL SYSTEM FOR EXHIBITION HALL LIGHTING CIRCUIT

(71) Applicant: Mingdi He, Hong Kong (HK)

(72) Inventor: Mingdi He, Hong Kong (HK)

(73) Assignee: SHENZHEN DANSHA TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/445,206

(22) Filed: Jun. 19, 2019

(65) Prior Publication Data

US 2019/0306947 A1    Oct. 3, 2019

(51) Int. Cl.
| | | |
|---|---|---|
| *H05B 45/10* | (2020.01) | |
| *F21V 23/02* | (2006.01) | |
| *F21V 23/00* | (2015.01) | |
| *H05B 47/155* | (2020.01) | |

(52) U.S. Cl.
CPC .......... *H05B 45/10* (2020.01); *F21V 23/007* (2013.01); *F21V 23/023* (2013.01); *H05B 47/155* (2020.01)

(58) Field of Classification Search
CPC . H05B 33/0845; H05B 37/029; F21V 23/007; F21V 23/023
See application file for complete search history.

(56) References Cited

U.S. PATENT DOCUMENTS

| | | | | |
|---|---|---|---|---|
| 6,912,429 | B1* | 6/2005 | Bilger | H05B 47/105 |
| | | | | 700/19 |
| 8,731,689 | B2* | 5/2014 | Platner | H05B 47/175 |
| | | | | 700/22 |
| 9,189,934 | B2* | 11/2015 | Jentoft | H04L 41/12 |
| 9,215,781 | B2* | 12/2015 | Marman | G06T 7/248 |
| 9,655,217 | B2* | 5/2017 | Recker | H05B 45/20 |
| 2015/0035440 | A1* | 2/2015 | Spero | F21S 41/65 |
| | | | | 315/153 |
| 2019/0154872 | A1* | 5/2019 | Leduc | G06T 7/292 |

* cited by examiner

*Primary Examiner* — Amy Cohen Johnson
*Assistant Examiner* — Jianzi Chen

(57) ABSTRACT

A control system for exhibition hall lighting circuit includes a first light intensity sensor, a second light intensity sensor, a data analysis module, a controller, a cabinet light control module, an exhibition hall light control module, a residual light control module, a display module, an alarm module, a power supply monitoring module, a UPS power supply, a power supply, a time synchronization module and an activity detection module. The first light intensity sensor and the second light intensity sensor enable the system to automatically turn on lights in an exhibition hall for lighting when the light intensity in the exhibition hall satisfies certain requirements. The activity detection module enables the system to turn on exhibition hall lights and cabinet lights in the exhibition hall when a light intensity difference is out of a certain range and there are activities of people in the exhibition hall.

20 Claims, 3 Drawing Sheets

CONTROL SYSTEM FOR EXHIBITION HALL LIGHTING CIRCUIT

FIELD OF THE PATENT APPLICATION

The present patent application generally relates to an exhibition hall lighting circuit and more specifically to a control system for exhibition hall lighting circuit.

BACKGROUND

Exhibition design refers to visual arts of all exhibitions and displays, including indoor and outdoor environmental planning and beautification design for commercial sales space and service space such as shopping malls, hotels, supermarkets and so on. Digital exhibition hall design focuses on 3D images so that the information is more visual and easier to understand while more information can be shown. Such digital exhibition hall design enriches ways of expressions of exhibition halls and therefore the exhibition halls can bring about profound experience. The hypermedia technology employed in the exhibition hall design has been widely applied in exhibition projects for real estate marketing, government planning, cultural activities, business achievements and so on.

However, at present, as for exhibition halls, the design of lighting systems is a key to the design of exhibition halls and an effective lighting system can better promote the exhibition of exhibition halls. However, at present, there lacks an effective exhibition hall lighting system which can not only illuminate an exhibition hall intelligently, but also guard against theft to some degree.

SUMMARY

The present patent application is directed to a control system for exhibition hall lighting circuit. In one aspect, the control system for exhibition hall lighting circuit includes a first light intensity sensor, a second light intensity sensor, a data analysis module, a controller, a cabinet light control module, an exhibition hall light control module, a residual light control module, a display module, an alarm module, a power supply monitoring module, a UPS power supply, a power supply, a time synchronization module and an activity detection module. The cabinet light control module is configured to control operation of cabinet lights in display cabinets in an exhibition hall. The exhibition hall light control module is configured to control operation of hall lights in the exhibition hall. The residual light control module is configured to control operation of lights except cabinet lights and exhibition hall lights. The first light intensity sensor is disposed in the exhibition hall and configured to acquire an information group of first light intensity information Hi produced at preset time intervals in the exhibition hall. The second light intensity sensor is disposed outside the exhibition hall and configured to detect in real time an information group of second light intensity information Ji produced at the preset time intervals outside the exhibition hall. The time synchronization module is synchronized with the Internet time. The controller is configured to acquire time information of the Internet in real time. The first light intensity sensor is configured to transmit the first light intensity information Hi to the data analysis module. The second light intensity sensor is configured to transmit the second light intensity information Ji to the data analysis module.

The data analysis module is configured to process the first light intensity information Hi and the second light intensity information Ji according to a processing method. The processing method includes the following steps:
step 1: deriving a light intensity difference X1 by subtracting the first light intensity information Hi from the second light intensity information Ji;
step 2: automatically deriving multiple light intensity differences Xi (i=2 . . . n) at the preset time intervals after deriving the initial light intensity difference X1;
step 3: deriving average light intensity differences O in real time and deriving light intensity values Si in accordance with a formula $$S_i = \frac{1}{N}\sqrt{\sum_{i=1}^{N}(X_i - O)^2};$$

step 4: deriving real-time varied values T of light intensity values Si in accordance with a formula $T=|S_i-S_{i-1}|$; and
step 5: determining the first light intensity information Hi when the real-time varied value T is greater than a first preset value, then determining the value of a formula $H_i-H_{i-1}$; transmitting a preparatory lighting signal to the controller when the value of the formula $H_i-H_{i-1}$ is greater than 0.

The data analysis module is configured to transmit a preparatory lighting signal to the controller according to the processing method when processing conditions are met. The activity detection module is configured to detect activities of people in the exhibition hall in real time and transmit an accessory lighting signal to the controller when detecting activities of people in the exhibition hall. The controller transmits a lighting signal to the exhibition hall light control module when receiving the accessory lighting signal transmitted by the activity detection module and the preparatory lighting signal transmitted by the data analysis module. The exhibition hall light control module turns on exhibition hall lights for lighting when receiving the lighting signal transmitted by the controller.

The controller may transmit a lighting signal to the cabinet light control module when receiving an accessory lighting signal transmitted by the activity detection module and a preparatory lighting signal transmitted by the data analysis module.

The cabinet light control module may turn on cabinet lights for lighting when receiving the lighting signal transmitted by the controller.

The power supply monitoring module may be configured to monitor operation of the power supply of the exhibition hall lighting system in real time. The power supply monitoring module may be configured to switch to the UPS power supply for power supply when detecting disconnection of the power supply. The power supply monitoring module may be configured to transmit a power supply alarm signal to the controller when detecting disconnection of the power supply. The controller may transmit the power supply alarm signal to the alarm module when receiving the power supply alarm signal transmitted by the power supply monitoring module. The alarm module may raise an alarm when receiving the power supply alarm signal transmitted by the controller.

The controller may transmit the power supply alarm signal to the display module when receiving the power supply alarm signal transmitted by the power supply monitoring module. The display module may automatically display words of "disconnection of power supply" when receiving the power supply alarm signal transmitted by the controller. The data analysis module may transmit a preparatory lighting signal to the controller when receiving second light intensity information Ji which is lower than a second preset value.

The data analysis module may be further configured to transmit a range lighting signal to the controller when the light intensity difference is out of a first preset range. The controller may transmit a lighting signal to the residual light control module when receiving the range lighting signal transmitted by the data analysis module. The residual light control module may turn on lights except cabinet lights and exhibition hall lights for lighting when receiving the lighting signal transmitted by the controller.

The data analysis module may transmit a regular lighting signal to the controller when the light intensity difference is out of a second preset range. The controller may be configured to transmit a lighting signal to the exhibition hall light control module when receiving the regular lighting signal transmitted by the data analysis module in a first preset time period. The exhibition hall light control module may turn on exhibition hall lights when receiving the lighting signal transmitted by the controller.

The controller may be further configured to transmit an anti-theft signal to the alarm module when receiving an accessory lighting signal transmitted by the activity detection module in a second preset time period. The alarm module may raise an alarm when receiving the anti-theft signal transmitted by the controller.

The controller may be further configured to transmit an anti-theft signal to the display module when receiving an accessory lighting signal transmitted by the activity detection module in a third preset time period. The display module displays words of "abnormal activities" when receiving the anti-theft signal transmitted by the controller.

In another aspect, the present patent application provides a control system for exhibition hall lighting circuit. The control system for exhibition hall lighting circuit includes a first light intensity sensor disposed in the exhibition hall and configured to acquire an information group of first light intensity information Hi produced at preset time intervals in the exhibition hall, a second light intensity sensor disposed outside the exhibition hall and configured to detect in real time an information group of second light intensity information Ji produced at the preset time intervals outside the exhibition hall, a data analysis module, a controller and an exhibition hall light control module configured to control operation of hall lights in the exhibition hall.

The first light intensity sensor is configured to transmit the first light intensity information Hi to the data analysis module. The second light intensity sensor is configured to transmit the second light intensity information Ji to the data analysis module.

The data analysis module is configured to process the first light intensity information Hi and the second light intensity information Ji according to a processing method. The processing method includes the following steps:

step 1: deriving a light intensity difference X1 by subtracting the first light intensity information Hi from the second light intensity information Ji;

step 2: automatically deriving multiple light intensity differences Xi (i=2 . . . n) at the preset time intervals after deriving the initial light intensity difference X1;

step 3: deriving average light intensity differences O in real time and deriving light intensity values Si in accordance with a formula $$S_i = \frac{1}{N}\sqrt{\sum_{i=1}^{N}(X_i - O)^2};$$

step 4: deriving real-time varied values T of light intensity values Si in accordance with a formula $T=|S_i-S_{i-1}|$; and step 5: determining the first light intensity information Hi when the real-time varied value T is greater than a first preset value, then determining the value of a formula $H_i-H_{i-1}$; transmitting a preparatory lighting signal to the controller when the value of the formula $H_i-H_{i-1}$ is greater than 0.

The data analysis module transmits a regular lighting signal to the controller when the light intensity difference is out of a second preset range. The controller is configured to transmit a lighting signal to the exhibition hall light control module when receiving the regular lighting signal transmitted by the data analysis module in a first preset time period. The exhibition hall light control module turns on exhibition hall lights when receiving the lighting signal transmitted by the controller.

The control system for exhibition hall lighting circuit may further include a cabinet light control module configured to control operation of cabinet lights in display cabinets in the exhibition hall and an activity detection module configured to detect activities of people in the exhibition hall in real time and transmit an accessory lighting signal to the controller when detecting activities of people in the exhibition hall. The data analysis module may transmit a preparatory lighting signal to the controller when receiving second light intensity information Ji which is lower than a second preset value. The data analysis module may be configured to transmit a preparatory lighting signal to the controller according to the processing method when processing conditions are met. The controller may transmit a lighting signal to the exhibition hall light control module when receiving the accessory lighting signal transmitted by the activity detection module and the preparatory lighting signal transmitted by the data analysis module. The exhibition hall light control module may turn on exhibition hall lights for lighting when receiving the lighting signal transmitted by the controller. The controller may transmit a lighting signal to the cabinet light control module when receiving an accessory lighting signal transmitted by the activity detection module and a preparatory lighting signal transmitted by the data analysis module. The cabinet light control module may turn on cabinet lights for lighting when receiving the lighting signal transmitted by the controller.

The control system for exhibition hall lighting circuit may further include a power supply monitoring module, a UPS power supply, a power supply, a display module and an alarm module. The power supply monitoring module may be configured to monitor operation of the power supply of the exhibition hall lighting system in real time. The power supply monitoring module may be configured to switch to the UPS power supply for power supply when detecting disconnection of the power supply. The power supply monitoring module may be configured to transmit a power supply alarm signal to the controller when detecting disconnection of the power supply. The controller may transmit the power supply alarm signal to the alarm module when receiving the power supply alarm signal transmitted by the power supply monitoring module. The alarm module may raise an alarm when receiving the power supply alarm signal transmitted by the controller. The controller may transmit the power supply alarm signal to the display module when receiving the power supply alarm signal transmitted by the power supply monitoring module. The display module may automatically display words of "disconnection of power supply" when receiving the power supply alarm signal transmitted by the controller.

The control system for exhibition hall lighting circuit may further include a residual light control module configured to control operation of lights except cabinet lights and exhibition hall lights. The data analysis module may be further configured to transmit a range lighting signal to the controller when the light intensity difference is out of a first preset range. The controller may transmit a lighting signal to the residual light control module when receiving the range lighting signal transmitted by the data analysis module. The residual light control module may turn on lights except cabinet lights and exhibition hall lights for lighting when receiving the lighting signal transmitted by the controller.

The control system for exhibition hall lighting circuit may further include a time synchronization module. The time synchronization module may be synchronized with the Internet time. The controller may be configured to acquire time information of the Internet in real time.

The controller may be further configured to transmit an anti-theft signal to the alarm module when receiving an accessory lighting signal transmitted by the activity detection module in a second preset time period. The alarm module may raise an alarm when receiving the anti-theft signal transmitted by the controller. The controller may be further configured to transmit an anti-theft signal to the display module when receiving an accessory lighting signal transmitted by the activity detection module in a third preset time period. The display module may display words of "abnormal activities" when receiving the anti-theft signal transmitted by the controller.

In yet another aspect, the present patent application provides a control system for exhibition hall lighting circuit. The control system for exhibition hall lighting circuit includes a first light intensity sensor disposed in the exhibition hall and configured to acquire an information group of first light intensity information Hi produced at preset time intervals in the exhibition hall, a second light intensity sensor disposed outside the exhibition hall and configured to detect in real time an information group of second light intensity information Ji produced at the preset time intervals outside the exhibition hall, a data analysis module, a controller, a cabinet light control module configured to control operation of cabinet lights in display cabinets in the exhibition hall, an exhibition hall light control module configured to control operation of hall lights in the exhibition hall and an activity detection module configured to detect activities of people in the exhibition hall in real time and transmit an accessory lighting signal to the controller when detecting activities of people in the exhibition hall. The first light intensity sensor is configured to transmit the first light intensity information Hi to the data analysis module. The second light intensity sensor is configured to transmit the second light intensity information Ji to the data analysis module.

The data analysis module is configured to process the first light intensity information Hi and the second light intensity information Ji according to a processing method. The processing method includes the following steps:

step 1: deriving a light intensity difference X1 by subtracting the first light intensity information Hi from the second light intensity information Ji;
step 2: automatically deriving multiple light intensity differences Xi (i=2 . . . n) at the preset time intervals after deriving the initial light intensity difference X1;
step 3: deriving average light intensity differences O in real time and deriving light intensity values Si in accordance with a formula $$S_i = \frac{1}{N}\sqrt{\sum_{i=1}^{N}(X_i - O)^2} \ ;$$

step 4: deriving real-time varied values T of light intensity values Si in accordance with a formula $T=|S_i-S_{i-1}|$; and
step 5: determining the first light intensity information Hi when the real-time varied value T is greater than a first preset value, then determining the value of a formula $H_i-H_{i-1}$; transmitting a preparatory lighting signal to the controller when the value of the formula $H_i-H_{i-1}$ is greater than 0.

The data analysis module is configured to transmit a preparatory lighting signal to the controller according to the processing method when processing conditions are met. The controller transmits a lighting signal to the exhibition hall light control module when receiving the accessory lighting signal transmitted by the activity detection module and the preparatory lighting signal transmitted by the data analysis module. The exhibition hall light control module turns on exhibition hall lights for lighting when receiving the lighting signal transmitted by the controller. The controller transmits a lighting signal to the cabinet light control module when receiving an accessory lighting signal transmitted by the activity detection module and a preparatory lighting signal transmitted by the data analysis module. The cabinet light control module turns on cabinet lights for lighting when receiving the lighting signal transmitted by the controller.

The control system for exhibition hall lighting circuit may further include a residual light control module configured to control operation of lights except cabinet lights and exhibition hall lights. The data analysis module may transmit a preparatory lighting signal to the controller when receiving second light intensity information Ji which is lower than a second preset value. The data analysis module may be further configured to transmit a range lighting signal to the controller when the light intensity difference is out of a first preset range. The controller may transmit a lighting signal to the residual light control module when receiving the range lighting signal transmitted by the data analysis module. The residual light control module may turn on lights except cabinet lights and exhibition hall lights for lighting when receiving the lighting signal transmitted by the controller. The data analysis module may transmit a regular lighting signal to the controller when the light intensity difference is out of a second preset range. The controller may be configured to transmit a lighting signal to the exhibition hall light control module when receiving the regular lighting signal transmitted by the data analysis module in a first preset time period. The exhibition hall light control module may turn on exhibition hall lights when receiving the lighting signal transmitted by the controller.

The control system for exhibition hall lighting circuit may further include a power supply monitoring module, a UPS power supply, a power supply, a display module and an alarm module. The power supply monitoring module may be configured to monitor operation of the power supply of the exhibition hall lighting system in real time. The power supply monitoring module may be configured to switch to the UPS power supply for power supply when detecting disconnection of the power supply. The power supply monitoring module may be configured to transmit a power supply alarm signal to the controller when detecting disconnection of the power supply. The controller may transmit the power supply alarm signal to the alarm module when receiving the power supply alarm signal transmitted by the power supply monitoring module. The alarm module may raise an alarm when receiving the power supply alarm signal transmitted by the controller. The controller may transmit the power supply alarm signal to the display module when receiving the power supply alarm signal transmitted by the power supply monitoring module. The display module may automatically display words of "disconnection of power supply" when receiving the power supply alarm signal transmitted by the controller.

The control system for exhibition hall lighting circuit may further include a time synchronization module. The time synchronization module may be synchronized with the Internet time. The controller may be configured to acquire time information of the Internet in real time.

The controller may be further configured to transmit an anti-theft signal to the alarm module when receiving an accessory lighting signal transmitted by the activity detection module in a second preset time period. The alarm module may raise an alarm when receiving the anti-theft signal transmitted by the controller. The controller may be further configured to transmit an anti-theft signal to the display module when receiving an accessory lighting signal transmitted by the activity detection module in a third preset time period. The display module may display words of "abnormal activities" when receiving the anti-theft signal transmitted by the controller.

DETAILED DESCRIPTION

Reference will now be made in detail to a preferred embodiment of the control system for exhibition hall lighting circuit disclosed in the present patent application, examples of which are also provided in the following description. Exemplary embodiments of the control system for exhibition hall lighting circuit disclosed in the present patent application are described in detail, although it will be apparent to those skilled in the relevant art that some features that are not particularly important to an understanding of the control system for exhibition hall lighting circuit may not be shown for the sake of clarity.

Furthermore, it should be understood that the control system for exhibition hall lighting circuit disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
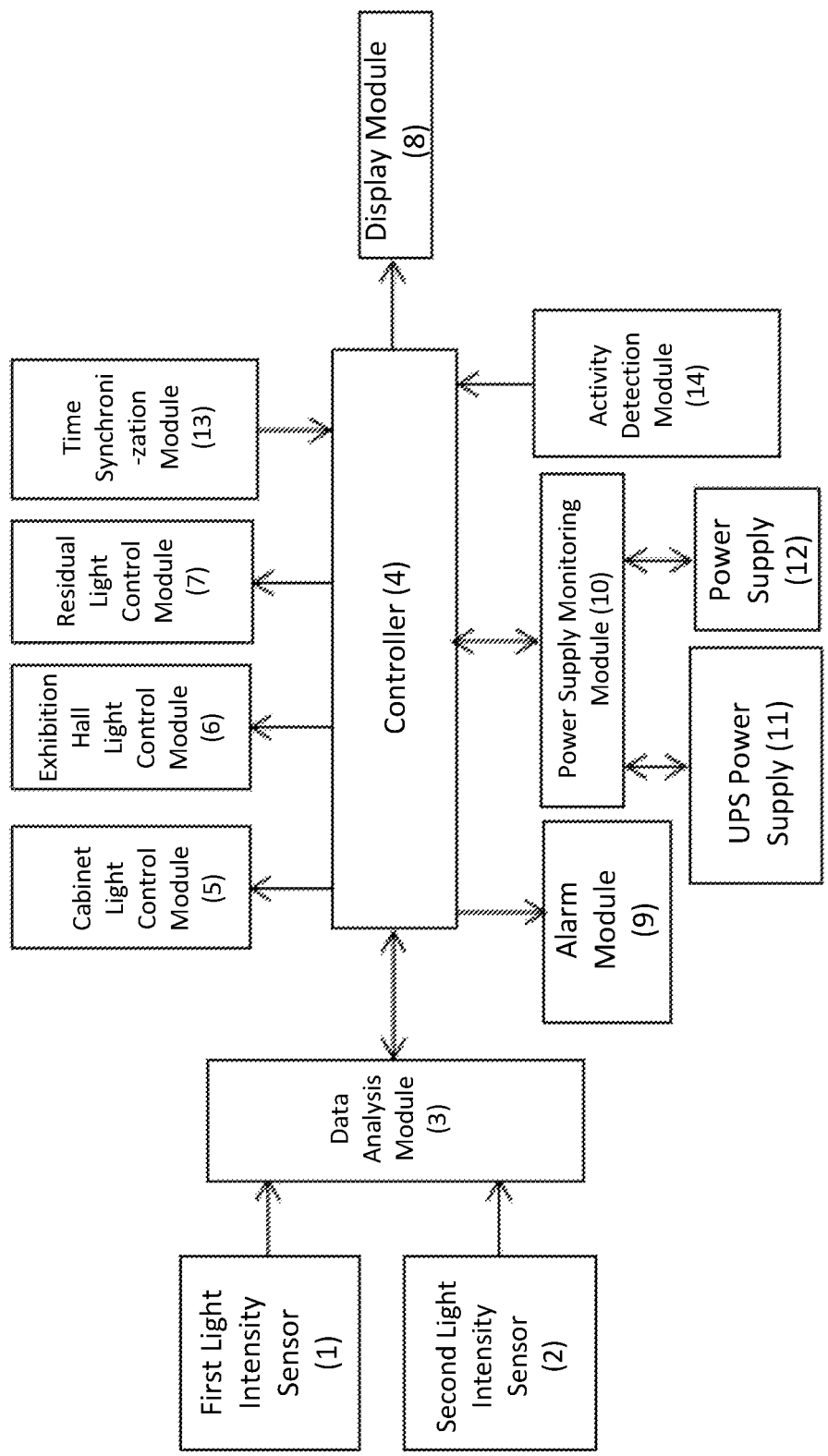
FIG. 1 is a block diagram of a control system for exhibition hall lighting circuit in accordance with the present patent application.
Figure 2:
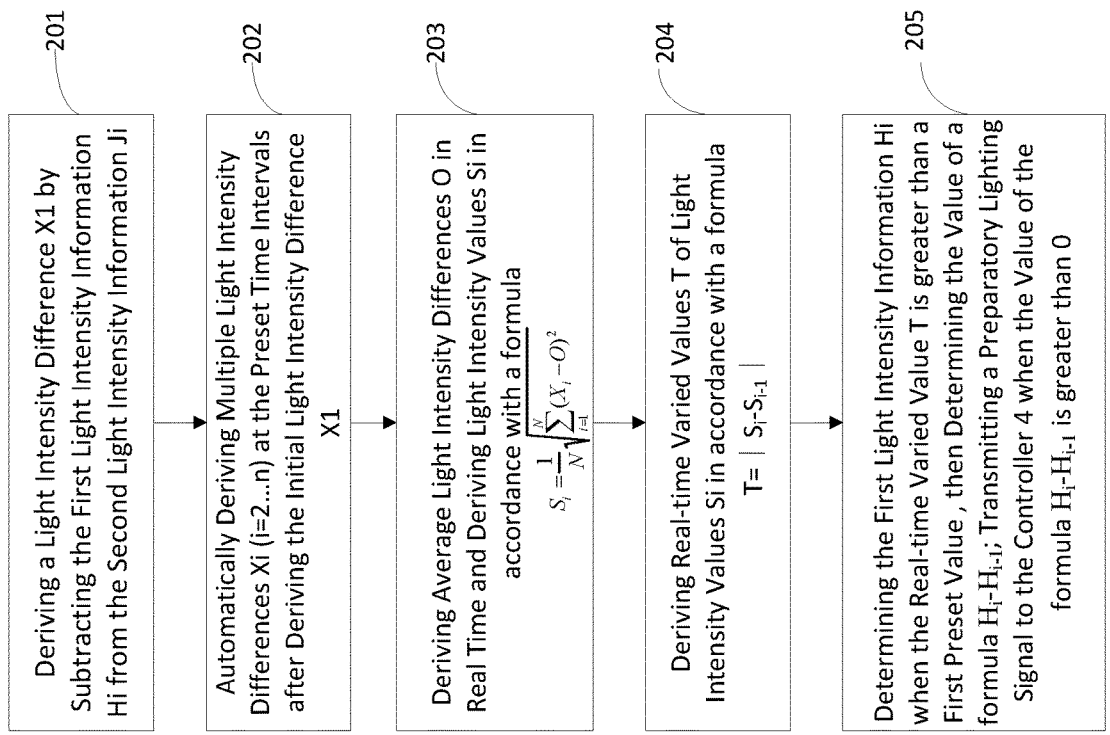
FIG. 2 is a flowchart illustrating a processing method of a data analysis module of the control system for exhibition hall lighting circuit as depicted in FIG. 1.
Figure 3:
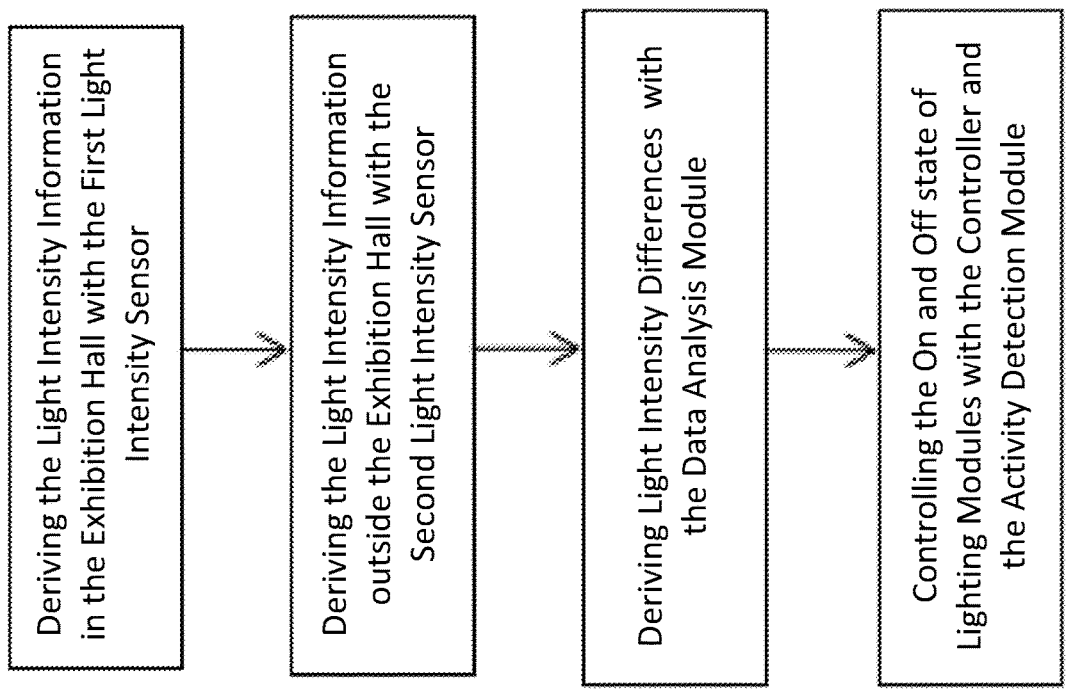
FIG. 3 illustrates the working principle of the control system for exhibition hall lighting circuit as depicted in FIG. 1.

Referring to FIG. 1 to FIG. 3, a control system for exhibition hall lighting circuit includes a first light intensity sensor 1, a second light intensity sensor 2, a data analysis module 3, a controller 4, a cabinet light control module 5, an exhibition hall light control module 6, a residual light control module 7, a display module 8, an alarm module 9, a power supply monitoring module 10, a UPS power supply 11, a power supply 12, a time synchronization module 13 and an activity detection module 14.

The cabinet light control module 5 is configured to control the operation of cabinet lights in display cabinets in an exhibition hall. The exhibition hall light control module 6 is configured to control the operation of hall lights in the exhibition hall (excluding cabinet lights and residual lights). The residual light control module 7 is configured to control the operation of lights except cabinet lights and exhibition hall lights. The first light intensity sensor 1 is disposed in the exhibition hall and configured to acquire an information group of first light intensity information Hi produced at preset time intervals (e.g. one to five minutes) in the exhibition hall. The second light intensity sensor 2 is disposed outside the exhibition hall and configured to detect in real time an information group of second light intensity information Ji produced at the preset time intervals (e.g. one to five minutes) outside the exhibition hall. The time synchronization module 13 is synchronized with the Internet time. The controller 4 is configured to acquire time information of the Internet in real time.

The first light intensity sensor 1 is configured to transmit the first light intensity information Hi to the data analysis module 3. The second light intensity sensor 2 is configured to transmit the second light intensity information Ji to the data analysis module 3. The data analysis module 3 is configured to process the first light intensity information Hi and the second light intensity information Ji according to the processing method described hereafter. Referring to FIG. 2, the processing method includes the following steps:

Step 201: deriving a light intensity difference X1 by subtracting the first light intensity information Hi from the second light intensity information Ji;

Step 202: automatically deriving multiple light intensity differences Xi (i=2 . . . n) at the preset time intervals (e.g. one to five minutes) after deriving the initial light intensity difference X1;

Step 203: deriving average light intensity differences O in real time and deriving light intensity values Si in accordance with a formula $$S_i = \frac{1}{N}\sqrt{\sum_{i=1}^{N}(X_i - O)^2}\ ;$$

Step 204: deriving real-time varied values T of light intensity values Si in accordance with a formula $T=|S_i-S_{i-1}|$;

Step 205: determining the first light intensity information Hi when the real-time varied value T is greater than a first preset value (e.g. 0.1-1.5 lux), then determining the value of a formula $H_i-H_{i-1}$; transmitting a preparatory lighting signal to the controller 4 when the value of the formula $H_i-H_{i-1}$ is greater than 0.

| Ji | Hi | Xi | Si | T |
|---|---|---|---|---|
| 146 | 250 | −104 | 2.3 | |
| 148 | 246 | −98 | 2.18 | 0.12 |
| 150 | 255 | −105 | 1.82 | 0.36 |
| 151 | 248 | −97 | 1.80 | 0.02 |
| 153 | 253 | −100 | 1.48 | 0.32 |
| 150 | 245 | −95 | 1.66 | 0.18 |
| 147 | 256 | −109 | 1.77 | 0.11 |
| 145 | 243 | −98 | 1.61 | 0.16 |
| 143 | 251 | −108 | 1.60 | 0.01 |
| 144 | 247 | −103 | 1.44 | 0.16 |

It is noted that the first light intensity information Hi and the second light intensity information Ji are not limited to the values listed above. The first preset value can be $(T_{max}+T_{min})/2$.

The data analysis module 3 is configured to transmit a preparatory lighting signal to the controller 4 according to the processing method described above when processing conditions are met. The activity detection module 14 is configured to detect the activities of people in the exhibition hall in real time. The activity detection module 14 transmits an accessory lighting signal to the controller 4 when detecting activities of people in the exhibition hall. The controller 4 transmits a lighting signal to the exhibition hall light control module 6 when receiving the accessory lighting signal transmitted by the activity detection module 14 and the preparatory lighting signal transmitted by the data analysis module 3. The exhibition hall light control module 6 turns on exhibition hall lights for lighting when receiving the lighting signal transmitted by the controller 4.

In addition, the controller 4 transmits a lighting signal to the cabinet light control module 5 when receiving an accessory lighting signal transmitted by the activity detection module 14 and a preparatory lighting signal transmitted by the data analysis module 3. The cabinet light control module 5 turns on cabinet lights for lighting when receiving the lighting signal transmitted by the controller 4.

Further, the power supply monitoring module 10 is configured to monitor the operation of the power supply 12 of the exhibition hall lighting system in real time. The power supply monitoring module 10 is configured to switch to the UPS power supply 11 for power supply when detecting the disconnection of the power supply 12.

The power supply monitoring module 10 is configured to transmit a power supply alarm signal to the controller 4 when detecting disconnection of the power supply 12. The controller 4 transmits the power supply alarm signal to the alarm module 9 when receiving the power supply alarm signal transmitted by the power supply monitoring module 10. The alarm module 9 raises an alarm when receiving the power supply alarm signal transmitted by the controller 4.

Furthermore, the controller 4 transmits the power supply alarm signal to the display module 8 when receiving the power supply alarm signal transmitted by the power supply monitoring module 10. The display module 8 automatically displays words of "disconnection of power supply" when receiving the power supply alarm signal transmitted by the controller 4.

The data analysis module 3 transmits a preparatory lighting signal to the controller 4 when receiving the second light intensity information Ji which is lower than a second preset value. For example, the second preset value can be 50-60 lux.

The data analysis module 3 is further configured to transmit a range lighting signal to the controller 4 when the light intensity difference is out of a first preset range (e.g. 90-110 lux). The controller 4 transmits a lighting signal to the residual light control module 7 when receiving the range lighting signal transmitted by the data analysis module 3. The residual light control module 7 turns on lights except cabinet lights and exhibition hall lights for lighting when receiving the lighting signal transmitted by the controller 4.

The data analysis module 3 transmits a regular lighting signal to the controller 4 when the light intensity difference is out of a second preset range (e.g. 110-150 lux). The controller 4 is configured to transmit a lighting signal to the exhibition hall light control module 6 when receiving the regular lighting signal transmitted by the data analysis module 3 in a first preset time period (e.g. 8:30-20:00). The exhibition hall light control module 6 turns on exhibition hall lights when receiving the lighting signal transmitted by the controller 4.

The controller 4 is further configured to transmit an anti-theft signal to the alarm module 9 when receiving an accessory lighting signal transmitted by the activity detection module 14 in a second preset time period (e.g. 20:30-8:00). The alarm module 9 raises an alarm when receiving the anti-theft signal transmitted by the controller 4.

The controller 4 is further configured to transmit an anti-theft signal to the display module 8 when receiving an accessory lighting signal transmitted by the activity detection module 14 in a third preset time period (e.g. 20:30-8:00). The display module 8 displays words of "abnormal activities" when receiving the anti-theft signal transmitted by the controller 4.

In one embodiment, when the first light intensity sensor 1 and the second light intensity sensor 2 transmit first light intensity information Hi and second light intensity information Ji to the data analysis module 3, the data analysis module 3 automatically derives light intensity differences and transmits a preparatory lighting signal to the controller 4 when a light intensity difference is out of a preset range.

At the same time, when the activity detection module 14 detects activities of people in the exhibition hall, the activity detection module 14 transmits an accessory lighting signal to the controller 4. The controller 4 transmits a lighting signal to the exhibition hall light control module 6 when receiving the accessory lighting signal transmitted by the activity detection module 14 and the preparatory lighting signal transmitted by the data analysis module 3. At this time, the exhibition hall light control module 6 turns on exhibition hall lights for lighting when receiving the lighting signal transmitted by the controller 4 and the cabinet light control module 5 drives and controls cabinet lights in exhibition cabinets to be turned on.

In another embodiment, the first light intensity sensor 1 and the second light intensity sensor 2 transmit first light intensity information Hi and second light intensity information Ji to the data analysis module 3. The data analysis module 3 is configured to transmit a range lighting signal to the controller 4 when a light intensity difference is out of a first preset range. The controller 4 transmits a lighting signal to the residual light control module 7 when receiving the range lighting signal transmitted by the data analysis module 3. The residual light control module 7 drives and controls lights except cabinet lights and exhibition hall lights to be turned on for lighting when receiving the lighting signal transmitted by the controller 4, as so to maintain the lighting of hallways in the exhibition hall.

In yet another embodiment, the controller 4 is further configured to transmit an anti-theft signal to the alarm module 9 when receiving an accessory lighting signal transmitted by the activity detection module 14 in a second preset time period. In the second preset time period, there are few activities of people. The alarm module 9 raises an alarm when receiving the anti-theft signal transmitted by the controller 4.

At the same time, the controller 4 transmits an anti-theft signal to the display module 8 when receiving an accessory lighting signal transmitted by the activity detection module 14 in a third preset time period. The display module 8 displays words of "abnormal activities" on the screen when receiving the anti-theft signal transmitted by the controller 4 so as to remind the working staff.

The design of a first light intensity sensor 1 and a second light intensity sensor 2 in a control system for exhibition hall lighting circuit enables the system to automatically turn on lights in an exhibition hall for lighting when the light intensity in the exhibition hall satisfies certain requirements. The configuration of a data analysis module 3 enables the system to detect the light intensity information in the exhibition hall effectively. The configuration of an activity detection module 14 enables the system to turn on exhibition hall lights and cabinet lights in the exhibition hall when the light intensity difference is out of a certain range and there are activities of people in the exhibition hall. When it is in a second preset time period and a controller 4 detects that exhibition hall lights need to be turned on, an alarm module 9 raises an alarm automatically. The present patent application is simple, effective and easy to use.

While the present patent application has been shown and described with particular references to a number of embodiments thereof, it should be noted that various other changes or modifications may be made without departing from the scope of the present invention.

What is claimed is:

1. A control system for exhibition hall lighting circuit comprising:
    a first light intensity sensor;
    a second light intensity sensor;
    a data analysis module;
    a controller;
    a cabinet light control module;
    an exhibition hall light control module;
    a residual light control module;
    a display module;
    an alarm module;
    a power supply monitoring module;
    a UPS power supply;
    a power supply;
    a time synchronization module; and
    an activity detection module; wherein:
    the cabinet light control module is configured to control operation of cabinet lights in display cabinets in an exhibition hall;
    the exhibition hall light control module is configured to control operation of hall lights in the exhibition hall;
    the residual light control module is configured to control operation of lights except cabinet lights and exhibition hall lights;
    the first light intensity sensor is disposed in the exhibition hall and configured to acquire an information group of first light intensity information (Hi) produced at preset time intervals in the exhibition hall;
    the second light intensity sensor is disposed outside the exhibition hall and configured to detect in real time an information group of second light intensity information (Ji) produced at the preset time intervals outside the exhibition hall;
    the time synchronization module is synchronized with the Internet time;
    the controller is configured to acquire time information of the Internet in real time;
    the first light intensity sensor is configured to transmit the first light intensity information (Hi) to the data analysis module;
    the second light intensity sensor is configured to transmit the second light intensity information (Ji) to the data analysis module;
    the data analysis module is configured to process the first light intensity information (Hi) and the second light intensity information (Ji) according to a processing method;
    the processing method comprises the following steps:
    step 1: deriving a light intensity difference (X1) by subtracting the first light intensity information (Hi) from the second light intensity information (Ji);
    step 2: automatically deriving a plurality of light intensity differences (Xi) (i=2 . . . n; n is an integer) at the preset time intervals after deriving the initial light intensity difference (X1);
    step 3: deriving average light intensity differences (O) in real time and deriving light intensity values (Si) in accordance with a formula $$S_i = \frac{1}{N}\sqrt{\sum_{i=1}^{N}(X_i - O)^2},$$

where Si represents an ith light intensity value, Xi represents an ith light intensity difference and O represents an average light intensity difference, N is an integer greater than 1, and i is an integer varying from 1 to N;
    step 4: deriving real-time varied values (T) of light intensity values (Si) in accordance with a formula $T=|S_i-S_{i-1}|$, where T represents a real-time varied value, Si represents an ith light intensity value, $S_{i-1}$ represents a (i−1)th light intensity value, and i is an integer greater than 1;
    step 5: determining the first light intensity information (Hi) when the real-time varied value (T) is greater than a first preset value, then determining the value of a formula $H_i-H_{i-1}$ where Hi represents an ith first light intensity information, $H_{i-1}$ represents a (i−1)th first light intensity information, and i is an integer greater than 1; transmitting a preparatory lighting signal to the controller when the value of the formula $H_i-H_{i-1}$ is greater than 0, where Hi represents an ith first light intensity information and $H_{i-1}$ represents a (i−1)th first light intensity information and i is an integer greater than 1;
    the data analysis module is configured to transmit a preparatory lighting signal to the controller according to the processing method when processing conditions are met;
    the activity detection module is configured to detect activities of people in the exhibition hall in real time and transmit an accessory lighting signal to the controller when detecting activities of people in the exhibition hall;
    the controller transmits a lighting signal to the exhibition hall light control module when receiving the accessory lighting signal transmitted by the activity detection module and the preparatory lighting signal transmitted by the data analysis module; and the exhibition hall light control module turns on exhibition hall lights for lighting when receiving the lighting signal transmitted by the controller.

2. The control system for exhibition hall lighting circuit of claim 1, wherein the controller transmits a lighting signal to the cabinet light control module when receiving an accessory lighting signal transmitted by the activity detection module and a preparatory lighting signal transmitted by the data analysis module; the cabinet light control module turns on cabinet lights for lighting when receiving the lighting signal transmitted by the controller.

3. The control system for exhibition hall lighting circuit of claim 1, wherein the power supply monitoring module is configured to monitor operation of the power supply of the exhibition hall lighting system in real time; the power supply monitoring module is configured to switch to the UPS power supply for power supply when detecting disconnection of the power supply; the power supply monitoring module is configured to transmit a power supply alarm signal to the controller when detecting disconnection of the power supply; the controller transmits the power supply alarm signal to the alarm module when receiving the power supply alarm signal transmitted by the power supply monitoring module; the alarm module raises an alarm when receiving the power supply alarm signal transmitted by the controller.

4. The control system for exhibition hall lighting circuit of claim 3, wherein the controller transmits the power supply alarm signal to the display module when receiving the power supply alarm signal transmitted by the power supply monitoring module; the display module automatically displays words of "disconnection of power supply" when receiving the power supply alarm signal transmitted by the controller.

5. The control system for exhibition hall lighting circuit of claim 1, wherein the data analysis module transmits a preparatory lighting signal to the controller when receiving second light intensity information (Ji) which is lower than a second preset value.

6. The control system for exhibition hall lighting circuit of claim 1, wherein the data analysis module is further configured to transmit a range lighting signal to the controller when the light intensity difference is out of a first preset range; the controller transmits a lighting signal to the residual light control module when receiving the range lighting signal transmitted by the data analysis module; the residual light control module turns on lights except cabinet lights and exhibition hall lights for lighting when receiving the lighting signal transmitted by the controller.

7. The control system for exhibition hall lighting circuit of claim 1, wherein the data analysis module transmits a regular lighting signal to the controller when the light intensity difference is out of a second preset range; the controller is configured to transmit a lighting signal to the exhibition hall light control module when receiving the regular lighting signal transmitted by the data analysis module in a first preset time period; the exhibition hail light control module turns on exhibition hall lights when receiving the lighting signal transmitted by the controller.

8. The control system for exhibition hall lighting circuit of claim 1, wherein the controller is further configured to transmit an anti-theft signal to the alarm module when receiving an accessory lighting signal transmitted by the activity detection module in a second preset time period; the alarm module raises an alarm when receiving the anti-theft signal transmitted by the controller.

9. The control system for exhibition hall lighting circuit of claim 1, wherein the controller is further configured to transmit an anti-theft signal to the display module when receiving an accessory lighting signal transmitted by the activity detection module in a third preset time period; the display module displays words of "abnormal activities" when receiving the anti-theft signal transmitted by the controller.

10. A control system for exhibition hall lighting circuit comprising:
a first light intensity sensor disposed in the exhibition hall and configured to acquire an information group of first light intensity information (Hi) produced at preset time intervals in the exhibition hall;
a second light intensity sensor disposed outside the exhibition hall and configured to detect in real time an information group of second light intensity information (Ji) produced at the preset time intervals outside the exhibition hall;
a data analysis module;
a controller; and
an exhibition hall light control module configured to control operation of hall lights in the exhibition hall;
wherein:
the first light intensity sensor is configured to transmit the first light intensity information (Hi) to the data analysis module;
the second light intensity sensor is configured to transmit the second light intensity information (Ji) to the data analysis module;
the data analysis module is configured to process the first light intensity information (Hi) and the second light intensity information (Ji) according to a processing method;
the processing method comprises the following steps:
step 1: deriving a light intensity difference (X1) by subtracting the first light intensity information (Hi) from the second light intensity information (Ji);
step 2: automatically, deriving a plurality of light intensity differences (Xi) (i=2 . . . n; n is an integer) at the preset time intervals after deriving the initial light intensity difference (X1);
step 3: deriving average light intensity differences (O) in real time and deriving light intensity values (Si) in accordance with a formula $$S_i = \frac{1}{N}\sqrt{\sum_{i=1}^{N}(X_i - O)^2},$$

where Si represents an ith light intensity value, Xi represents an ith light intensity difference and O represents an average light intensity difference, N is an integer greater than 1, and i is an integer varying from 1 to N;
step 4: deriving real-time varied values (T) of light intensity values (Si) in accordance with a formula $T=|S_i-S_{i-1}|$, where T represents a real-time varied value, Si represents an ith light intensity value, $S_{i-1}$ represents a (i–1)th light intensity value, and i is an integer greater than 1;
step 5: determining the first light intensity information (Hi) when the real-time varied value (T) is greater than a first preset value, then determining the value of a formula $H_i-H_{i-1}$ where Hi represents an ith first light intensity information, $H_{i-1}-H_{i-1}$ represents a (i–1)th first light intensity information, and i is an integer greater than 1; transmitting a preparatory lighting signal to the controller when the value of the formula $H_i-H_{i-1}$ is greater than 0, where Hi represents an ith first light intensity information and $H_{i-1}$ represents a (i−1)th first light intensity information and i is an integer greater than 1;

the data analysis module transmits a regular lighting signal to the controller when the light intensity difference is out of a first preset range;

the controller is configured to transmit a lighting signal to the exhibition hall light control module when receiving the regular lighting signal transmitted by the data analysis module in a first preset time period; and the exhibition hall light control module turns on exhibition hall lights when receiving the lighting signal transmitted by the controller.

11. The control system for exhibition hall lighting circuit of claim 10 further comprising a cabinet light control module configured to control operation of cabinet lights in display cabinets in the exhibition hall and an activity detection module configured to detect activities of people in the exhibition hall in real time and transmit an accessory lighting signal to the controller when detecting activities of people in the exhibition hall, wherein the data analysis module transmits a preparatory lighting signal to the controller when receiving second light intensity information (Ji) which is lower than a second preset value; the data analysis module is configured to transmit a preparatory lighting signal to the controller according to the processing method when processing conditions are met; the controller transmits a lighting signal to the exhibition hall light control module when receiving the accessory lighting signal transmitted by the activity detection module and the preparatory lighting signal transmitted by the data analysis module; the exhibition hall light control module turns on exhibition hall lights for lighting when receiving the lighting signal transmitted by the controller; the controller transmits a lighting signal to the cabinet light control module when receiving an accessory lighting signal transmitted by the activity detection module and a preparatory lighting signal transmitted by the data analysis module; the cabinet light control module turns on cabinet lights for lighting when receiving the lighting signal transmitted by the controller.

12. The control system for exhibition hall lighting circuit of claim 11 further comprising a power supply monitoring module, a UPS power supply, a power supply, a display module and an alarm module, wherein the power supply monitoring module is configured to monitor operation of the power supply of the exhibition hall lighting system in real time; the power supply monitoring module is configured to switch to the UPS power supply for power supply when detecting disconnection of the power supply; the power supply monitoring module is configured to transmit a power supply alarm signal to the controller when detecting disconnection of the power supply; the controller transmits the power supply alarm signal to the alarm module when receiving the power supply alarm signal transmitted by the power supply monitoring module; the alarm module raises an alarm when receiving the power supply alarm signal transmitted by the controller; the controller transmits the power supply alarm signal to the display module when receiving the power supply alarm signal transmitted by the power supply monitoring module; the display module automatically displays words of "disconnection of power supply" when receiving the power supply alarm signal transmitted by the controller.

13. The control system for exhibition hall lighting circuit of claim 12 further comprising a residual light control module configured to control operation of lights except cabinet lights and exhibition hail lights, wherein the data analysis module is further configured to transmit a range lighting signal to the controller when the light intensity difference is out of a second preset range; the controller transmits a lighting signal to the residual light control module when receiving the range lighting signal transmitted by the data analysis module; the residual light control module turns on lights except cabinet lights and exhibition hall lights for lighting when receiving the lighting signal transmitted by the controller.

14. The control system for exhibition hall lighting circuit of claim 13 further comprising a time synchronization module, wherein the time synchronization module is synchronized with the Internet time; the controller is configured to acquire time information of the Internet in real time.

15. The control system for exhibition hall lighting circuit of claim 14, wherein the controller is further configured to transmit an anti-theft signal to the alarm module when receiving an accessory lighting signal transmitted by the activity detection module in a second preset time period; the alarm module raises an alarm when receiving the anti-theft signal transmitted by the controller; the controller is further configured to transmit an anti-theft signal to the display module when receiving an accessory lighting signal transmitted by the activity detection module in a third preset time period; the display module displays words of "abnormal activities" when receiving the anti-theft signal transmitted by the controller.

16. A control system for exhibition hall lighting circuit comprising:

a first light intensity sensor disposed in the exhibition hall and configured to acquire an information group of first light intensity information (Hi) produced at preset time intervals in the exhibition hall;

a second light intensity sensor disposed outside the exhibition hall and configured to detect in real time an information group of second light intensity information (Ji) produced at the preset time intervals outside the exhibition hall;

a data analysis module;

a controller;

a cabinet light control module configured to control operation of cabinet lights in display cabinets in the exhibition hall;

an exhibition hall light control module configured to control operation of hall lights in the exhibition hall; and an activity detection module configured to detect activities of people in the exhibition hall in real time and transmit an accessory lighting signal to the controller when detecting activities of people in the exhibition hall; wherein:

the first light intensity sensor is configured to transmit the first light intensity information (Hi) to the data analysis module;

the second light intensity sensor is configured to transmit the second light intensity information (Ji) to the data analysis module;

the data analysis module is configured to process the first light intensity information (Hi) and the second light intensity information (Ji) according to a processing method;

the processing method comprises the following steps:

step 1: deriving a light intensity difference (X1) by subtracting the first light intensity information (Hi) from the second light intensity information (Ji);

step 2: automatically deriving a plurality of light intensity differences (Xi) (i=2 . . . n; n is an integer) at the preset time intervals after deriving the initial light intensity difference (X1);

step 3: deriving average light intensity differences (O) in real time and deriving light intensity values (Si) in accordance with a formula $$S_i = \frac{1}{N}\sqrt{\sum_{i=1}^{N}(X_i - O)^2},$$

where Si represents an ith light intensity value, Xi represents an ith light intensity difference and O represents an average light intensity difference, N is an integer greater than 1, and i is an integer varying from 1 to N;

step 4: deriving real-time varied values (T) of light intensity values (Si) in accordance with a formula $T=|S_i-S_{i-1}|$, where T represents a real-time varied value, Si represents an ith light intensity value, $S_{i-1}$ represents a (i–1)th light intensity value, and i is an integer greater than 1;

step 5: determining the first light intensity information (Hi) when the real-time varied value (T) is greater than a first preset value, then determining the value of a formula $H_i-H_{i-1}$ where Hi represents an ith first light intensity information, $H_{i-1}$ represents a (i–1)th first light intensity information, and i is an integer greater than 1; transmitting a preparatory lighting signal to the controller when the value of the formula $H_i-H_{i-1}$ is greater than 0, where Hi represents an ith first light intensity information and $H_{i-1}$ represents a (i–1)th first light intensity information and i is an integer greater than 1;

the data analysis module is configured to transmit a preparatory lighting signal to the controller according to the processing method when processing conditions are met;

the controller transmits a lighting signal to the exhibition hall light control module when receiving the accessory lighting signal transmitted by the activity detection module and the preparatory lighting signal transmitted by the data analysis module;

the exhibition hall light control module turns on exhibition hail lights for lighting when receiving the lighting signal transmitted by the controller;

the controller transmits a lighting signal to the cabinet light control module when receiving an accessory lighting signal transmitted by the activity detection module and a preparatory lighting signal transmitted by the data analysis module; and the cabinet light control module turns on cabinet lights for lighting when receiving the lighting signal transmitted by the controller.

17. The control system for exhibition hall lighting circuit of claim 16 further comprising a residual light control module configured to control operation of lights except cabinet lights and exhibition hall lights, wherein the data analysis module transmits a preparatory lighting signal to the controller when receiving second light intensity information (Ji) which is lower than a second preset value; the data analysis module is further configured to transmit a range lighting signal to the controller when the light intensity difference is out of a first preset range; the controller transmits a lighting signal to the residual light control module when receiving the range lighting signal transmitted by the data analysis module; the residual light control module turns on lights except cabinet lights and exhibition hall lights for lighting when receiving the lighting signal transmitted by the controller; the data analysis module transmits a regular lighting signal to the controller when the light intensity difference is out of a second preset range; the controller is configured to transmit a lighting signal to the exhibition hall light control module when receiving the regular lighting signal transmitted by the data analysis module in a first preset time period; the exhibition hall light control module turns on exhibition hall lights when receiving the lighting signal transmitted by the controller.

18. The control system for exhibition hall lighting circuit of claim 17 further comprising a time synchronization module, wherein the time synchronization module is synchronized with the Internet time; the controller is configured to acquire time information of the Internet in real time.

19. The control system for exhibition hall lighting circuit of claim 17, wherein the controller is further configured to transmit an anti-theft signal to the alarm module when receiving an accessory lighting signal transmitted by the activity detection module in a second preset time period; the alarm module raises an alarm when receiving the anti-theft signal transmitted by the controller; the controller is further configured to transmit an anti-theft signal to the display module when receiving an accessory lighting signal transmitted by the activity detection module in a third preset time period; the display module displays words of "abnormal activities" when receiving the anti-theft signal transmitted by the controller.

20. The control system for exhibition hall lighting circuit of claim 16 further comprising a power supply monitoring module, a UPS power supply, a power supply, a display module and an alarm module, wherein the power supply monitoring module is configured to monitor operation of the power supply of the exhibition hall lighting system in real time; the power supply monitoring module is configured to switch to the UPS power supply for power supply when detecting disconnection of the power supply; the power supply monitoring module is configured to transmit a power supply alarm signal to the controller when detecting disconnection of the power supply; the controller transmits the power supply alarm signal to the alarm module when receiving the power supply alarm signal transmitted by the power supply monitoring module; the alarm module raises an alarm when receiving the power supply alarm signal transmitted by the controller; the controller transmits the power supply alarm signal to the display module when receiving the power supply alarm signal transmitted by the power supply monitoring module; the display module automatically displays words of "disconnection of power supply" when receiving the power supply alarm signal transmitted by the controller.

* * * * *